United States Patent [19]

Abbe et al.

[11] Patent Number: 4,897,015

[45] Date of Patent: Jan. 30, 1990

[54] ROTARY TO LINEAR MOTION ROBOT ARM

[75] Inventors: Robert C. Abbe, Newton; David G. Baker, North Grafton, both of Mass.

[73] Assignee: ADE Corporation, Newton, Mass.

[21] Appl. No.: 51,090

[22] Filed: May 15, 1987

[51] Int. Cl.$^4$ ................................................ B25J 9/06
[52] U.S. Cl. .................................. 414/744.8; 414/751; 901/17; 901/21
[58] Field of Search .......................... 901/21, 17, 15; 474/133, 134; 414/744 A, 744 R, 744 B, 744 C, 749, 751; 74/52

[56] References Cited

U.S. PATENT DOCUMENTS

| | | | |
|---|---|---|---|
| 3,363,474 | 1/1968 | Ritter et al. | 74/52 |
| 3,401,568 | 9/1968 | Blatt | 74/52 X |
| 3,561,614 | 2/1971 | Tezuka et al. | 414/751 |
| 3,920,972 | 11/1975 | Corwin, Jr. et al. | 235/151.11 |
| 4,196,049 | 4/1980 | Burns et al. | 901/17 X |
| 4,299,533 | 11/1981 | Ohnaka | 901/21 X |
| 4,305,130 | 12/1981 | Kelley et al. | 364/513 |
| 4,402,053 | 8/1983 | Kelley et al. | 364/513 |
| 4,511,348 | 4/1985 | Witdoek et al. | 474/133 X |
| 4,531,885 | 7/1985 | Molaug | 414/735 |
| 4,547,119 | 10/1985 | Chance et al. | 414/735 |
| 4,583,962 | 4/1986 | Bytzek et al. | 474/133 |
| 4,632,632 | 12/1986 | Simone | 901/17 X |

FOREIGN PATENT DOCUMENTS

| | | | |
|---|---|---|---|
| 1206077 | 1/1986 | U.S.S.R. | 414/751 |
| 2182297 | 5/1987 | United Kingdom | 901/21 |

Primary Examiner—Leslie J. Paperner
Attorney, Agent, or Firm—Weingarten, Schurgin, Gagnebin & Hayes

[57] ABSTRACT

A robot arm in which a hand or end effector placed at the end of, and pivotally joined to first and second pivotally coupled arms is caused to experience linear, straight line motion in response to a single rotary actuator at the far end of the further most arm. A series of belts and pulleys of different sizes coordinate the motion of the two arms and the hand in order to produce straight line or radial motion in response to a single rotary actuator. The robot arm has particular application in semiconductor wafer handling systems in such capacity as transferring wafers between storage cassettes and test platforms and in this application is married to Z and $\theta$ motion drives.

11 Claims, 1 Drawing Sheet

ROTARY TO LINEAR MOTION ROBOT ARM

FIELD AND BACKGROUND OF THE INVENTION

Robot arms, or computer controlled jointed and articulated manipulators, are known in the art for accomplishing numerous routine positioning and placement functions. Robot arms utilizing one or more pivotally joined arm members and terminating in a hand or end effector typically require a number of controlled motor drives to control the motion in one or more degrees of freedom between the arm members at each joint or elbow. In addition, each motor must be coordinated with all other motors through computer control in order to provide a prescribed motion for the end effector in accomplishing its various routine positioning or manipulation task.

In the semiconductor processing industry it is typical for a single semiconductor wafer to be processed through a plurality of tests for parameters such as thickness, resistivity, surface characteristics, etc. Typically the wafers are passed from a cassette, one wafer per slot, and one wafer at a time through the test stations into a recepticle cassette until an entire cassette full of wafers has been processed. The task of moving the wafers from cassette to cassette through the various test stations is typically automated using sophisticated elevator and conveyor belt mechanisms in order to accurately position the wafer at each test station and to place it in an output cassette in a location to which the data taken at the test station can be associated.

BRIEF SUMMARY OF THE INVENTION

In accordance with the teaching of the present invention a robot arm is disclosed, particularly suitable for manipulating semiconductor wafers, and in particular for use as a partial or complete replacement for conventional elevator and conveyor equipment. The robot arm of the present invention utilizes a single motor drive to control a multi-linkage or multi-arm robot arm to produce straight line, radial motion from motor driven rotary motion. Additional motor drives or clutch mechanisms will allow the robot arm to move vertically in Z or about an angle $\theta$ thereby to serve a set of stations.

The robot arm of the present invention includes an end effector or hand member typically mounted to one end of the first arm, the opposite end of which is pivotally mounted to a second arm. The opposite end of the second arm is in turn pivotally mounted about a central axis for rotation under control of the motor drive. A set of pulleys and drive belts coordinates the motion of the first and second arms and of the end effector or hand in such manner that the combination of arms under motor control flexes in and out from the pivot at the drive motor maintaining the orientation of the end effector, thereby producing substantially straight line motion, radial with respect to the central axis, of the end effector. Such motion is particularly useful in such tasks as inserting and retrieving semiconductor wafers into and out of a cassette and placing them onto a platform of a test station.

The belt and pulley system effects, in response to rotation of the arm member closest to the drive motor, an opposite angular rotation of the second arm of twice the magnitude and in turn produces a relative rotation of the end effector with respect to the second arm of half that of the second arm and in an opposite direction thereto. The net result is to produce the intended and desired straight line radial motion responsive to control motor induced or drive motor induced rotary motion at the central axis of the robot arm.

A highly precise robot arm positioning motion can be achieved utilizing precise pivoting bearings and low stretch steel, indexed drive belts wrapped around associated pulleys with relative ease and simplicity. In combination with a Z and $\theta$ induced motion, a complete positioning arm is provided.

BRIEF DESCRIPTION OF THE DRAWING

These and other features of the present invention are more fully set forth below in the solely exemplary detailed description and accompanying drawing of which.

DETAILED DESCRIPTION

The present invention contemplates a robot arm in which a single motor drive is capable of converting rotary motion into radial motion of an end effector at the end of the mechanical linkages of the arm while at the same time, through other control motors or clutching, $\theta$ and Z, or rotation and elevation, motion of the end effector is produced thereby achieving complex motion from a single motor drive assembly.

Figure 1:
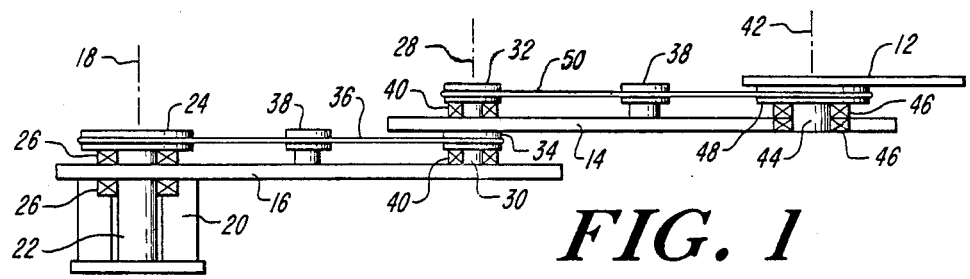
FIG. 1 is an elevation diagrammatic view of a robot arm according to the present invention.
Figure 2:
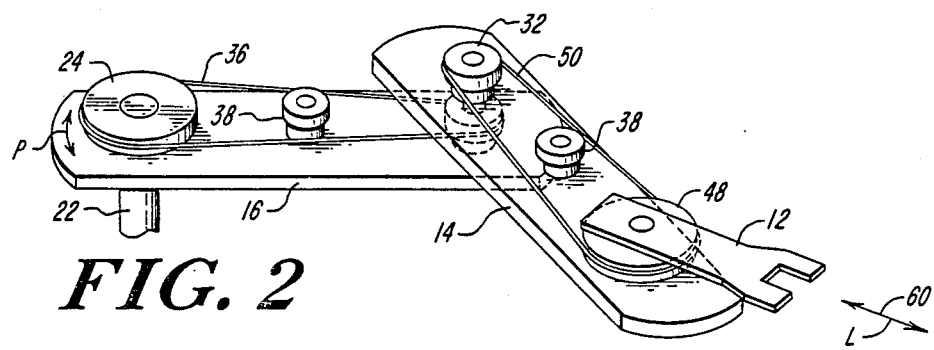
FIG. 2 is a perspective view of the robot arm of FIG. 1.

With reference now to FIGS. 1 and 2 there is shown a robot arm according to the present invention. An end effector 12 is pivotally connected to a first arm 14 which is in turn pivotally connected to a second arm 16. The arm 16 is rotationally driven about an axis 18 by harmonic drive motor 20 coupled to the arm 16. A shaft 22 extends through the motor 20 and arm 16 to a pulley 24 which is supported by bearings 26 to permit rotation between the arm 16 and the shaft, and attached pulley 24. The motor 20 is operative to rotate the arm 16 while the shaft 22 and pulley 24 remain stationary.

The arms 14 and 16 are pivoted about an axis 28. In particular a shaft 30 extends upward from the arm 16 through an aperture in the arm 14 to a pulley 32 affixed to the arm 16 via shaft 30. A pulley 34 is fixed to the underside of arm 14 about shaft 30. A belt 36 is wrapped about the pulleys 24 and 34. The diameter of the pulley 34 is one half the diameter of the pulley 24 for reasons to be explained below. An idler pulley 38 is supported on the arm 16 to provide tensioning as desired of the belt 36. Bearings 40 rotationally support the shaft 30 and pulley 34 from the pulley 32 and arm 16.

An axis 42 extends from the far end of the arm 14 and represents the pivot point about which the end effector 12 pivots with respect to the arm 14. The end effector 12 is joined to a shaft 44 which passes through bearings 46 permitting it to rotate with respect to the arm 14. On the underside of the end effector 12 a pulley 48 is fixed and a belt 50 is wrapped about the pulleys 32 and 48. In particular, pulley 32 is a diameter one half the diameter of the pulley 48. In practice the pulleys 24 and 48 will be of the same diameter and the pulleys 34 and 32 will be of the same diameter, one half that of the other pulleys. The axes 18, 28 and 42 will be equally spaced.

Figure 3:
FIGS. 3 and 4 are views of alternate pulley belts for use in the robot arm of the present invention.
Figure 4:
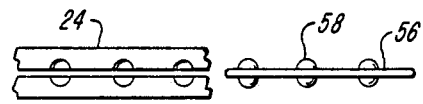

The belts 36 and 50 are typically fabricated of a steel or low stretch high strength material. As illustrated in FIG. 3 the belts may include timing belts or chains exemplified by stainless steel bands 52 having apertures 54 for which teeth or corresponding protrusions 54' are formed in the pulleys 24, 32, 34 and 48 to provide positive traction and nonslip positioning. Alternatively, as illustrated in FIG. 4 the belt may include a central spine 56 and spurs or teeth 58 which have corresponding indents or detents 58' in the pulleys 24, 32, 34 and 48 for the similar purpose for providing slip-free motion between the pulleys. Exact and known arm position can be controlled through the use of a stepper motor or encoder equipped servo form of motor 20.

The linkages represented by the arrangement of pulleys and belts illustrated in FIGS. 1 and 2 convert the rotary motion about the axis 18 into rectilinear motion of the end effector 12 particularly along the axis 60 which runs through the axis 18. In operation, rotation by the motor 20 of the arm 16 about the axis 18 will produce, through the pulleys 24 and 34 joined by the belt 36 owing to their ratio of diameters, a relative motion between the arms 16 and 14 of twice the magnitude and in the opposite direction of rotation of arm 16 alone about axis 18. This in effect causes the axis 42 to travel toward and away from axis 18 along a substantially straight line 60. The cooperation of the mechanical linkage between the pulleys 32 and 48 through the belt 50 produces, with rotation of the arm 16 and corresponding rotation of the arm 14, a rotation of the end effector 12 with respect to the arm 14 in a direction opposite to the rotation of arm 14 with respect to arm 16 and at a magnitude of one half the magnitude thereof. This in turn maintains the angular orientation of the end effector 12 with the rotation of the arm 16, moving it in and out along the axis 60, pointing in the same direction.

Figure 5:
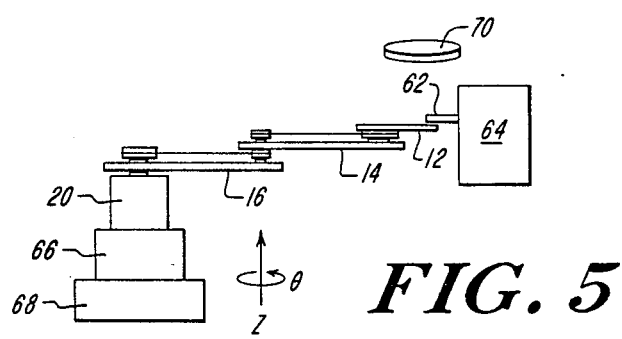
FIG. 5 is a schematic diagram of the robot arm of the present invention in an application for conveying semiconductor wafers between wafer cassettes and test station platforms.

In this manner the robot arm of the invention, as illustrated in FIG. 5, may be utilized to transport a wafer 62 from a cassette 64, using the in and out rectilinear motion of the end effector 12 under control of the motor 20, and elevation motion and rotation motion of the entire robot arm assembly under control, either of clutch mechanisms within the motor 20, or auxiliary Z and $\theta$ motor drives 66 and 68. The wafer 62 can thus be extracted from the cassette 64, elevated and/or rotated onto a platform 70 from which various wafer parameters can be detected utilizing known detection techniques. The wafer thus processed can be conveyed by the robot arm system back to the same or a different cassette 64.

The thus described robot arm of the present invention provides a simple and effective control mechanism for utilizing rotational motion particularly one used for producing Z and $\theta$ motion, into linear motion of an end effector. The exemplary description above is intended as illustrative only, the true scope of the invention being as shown in the following claims.

We claim:

1. A robot arm for converting rotary to linear motion comprising:
    a mechanical hand;
    a mechanical forearm;
    a mechanical arm;
    first pivot means for pivotally supporting said hand to said forearm;
    second pivot means for pivotally supporting said forearm to said arm;
    central pivot means for rotating said arm about a reference at a central pivot distinct from said second pivot means;
    means coupling said forearm to said reference at a 1:2 rotation ratio and coupling said hand to said arm at a 2:1 rotation ratio thereby causing coordinated rotation of said hand and forearm about said first and second pivot means respectively mechanically in response to rotation of said arm about said central pivot to cause said hand to move linearly with said rotation while maintaining a predetermined angular orientation of said hand relative to said reference arm;
    first drive means for driving said arm relative to said reference to cause said hand to move radially toward and away from said central pivot without rotation ($\theta$ motion) about said central pivot thereby permitting said hand to be moved forward and withdrawn without rotation; and
    second drive means for causing said hand to rotate ($\theta$ motion) about said central pivot without experiencing radial motion (r motion) whereby said hand can be independently driven in r and $\theta$ motions about said central pivot thereby to access points in a horizontal plane.

2. The robot arm of claim 1 wherein said means for producing coordinated motion includes mechanical coupling means.

3. The pivot arm of claim 2 wherein said mechanical coupling means includes a belt and pulley mechanism.

4. The robot arm of claim 3 wherein said belt and pulley mechanism further includes:
    first pulley means of a first diameter pivoted through said central pivot means and fixed with respect to said means for producing coordinated rotation;
    second pulley means being of a diameter one half the diameter of said first pulley means and affixed to said forearm for rotation about said second pivot means;
    third pulley means of a specified diameter positioned about said second pivot means and affixed to said arm;
    fourth pulley means affixed to said hand to rotate therewith about said first pivot means;
    said fourth pulley means being of a diameter twice the specified diameter of said third pulley means; and
    a first belt coupling said first and second pulley means and a second belt coupling said third and fourth pulley means.

5. The robot arm of claim 4 wherein said first and second belts are provided with indexing stubs and said first, second, third and fourth pulley means have complimentary detents.

6. The robot arm of claim 4 wherein said first and second belts have indexing apertures and said first, second, third and fourth pulley means have complimentary stubs.

7. The robot arm of claim 4 further including idler wheel means for said first and second belts.

8. The robot arm of claim 1 wherein the distance between said central pivot and said second pivot means is the same as the distance between said second pivot means and said first pivot means.

9. A robot arm comprising:
    a first arm rotatable about a first pivot point with respect to a reference;

a second arm rotatable about a second pivot point on said first arm remote from said first pivot point;

and end effector rotatable about a third pivot point located on said second arm remote from said first pivot point;

first means for producing coordinated rotation of said end effector with respect to said second arm including a coupling between said end effector and said first arm at a 1:2 rotation ratio, said second arm with respect to said first arm and of said first arm about said first pivot point including a coupling between said second arm and said reference at a 2:1 rotation ratio whereby said end effector is caused to effect translational motion while maintaining a predetermined angular orientation of said effector relative to said reference in response to rotation of said first arm about said first pivot; and second drive means for causing said end effector to rotate ($\theta$ motion) about said central pivot without experiencing radial motion (r motion) whereby said end effector can be independently driven in r and $\theta$ motions about said central pivot thereby to access points in a horizontal plane.

10. The robot arm of claim 9 wherein said first means includes means for causing said second arm to rotate about said second pivot point with respect to said first arm at a rotational rate twice the rotational rate of said first arm about said first pivot point and for causing said end effector to rotate about said third pivot point with respect to said second arm at a rate equal to one half of the rate of rotation of said second arm about said first arm through said second pivot point whereby said end effector rotates at the same rate, and in the same sense as the rotation of said first arm about said first pivot point.

11. The robot arm of claim 9 wherein said second pivot point is located the same distance from said first and third pivot points respectively along said first and second arms.

* * * * *